United States Patent
Basov et al.

(12)

(10) Patent No.: US 8,560,569 B2
(45) Date of Patent: Oct. 15, 2013

(54) METHOD AND APPARATUS FOR PERFORMING BULK FILE SYSTEM ATTRIBUTE RETRIEVAL

(75) Inventors: Ivan Basov, Westborough, MA (US); Christian J. Chuba, Berkeley Heights, NJ (US); Stephen A. Fridella, Belmont, MA (US); Uday K. Gupta, Westford, MA (US); Xiaoye Jiang, Shrewsbury, MA (US); Christopher Stacey, Swindon (GB); Jiannan Zheng, Ashland, MA (US); Eyal Zimran, London (GB)

(73) Assignee: EMC Corporation, Hopkinton, MA (US)

( * ) Notice: Subject to any disclaimer, the term of this patent is extended or adjusted under 35 U.S.C. 154(b) by 1594 days.

(21) Appl. No.: 11/341,353

(22) Filed: Jan. 27, 2006

(65) Prior Publication Data

US 2007/0179934 A1    Aug. 2, 2007

(51) Int. Cl.
*G06F 17/30* (2006.01)

(52) U.S. Cl.
USPC .................. 707/771; 707/770; 707/E17.014

(58) Field of Classification Search
USPC ........ 707/1, 2, 3, 6, 10, 100, 101, 102, 104.1; 711/141, 162, 161; 714/6; 717/101
See application file for complete search history.

(56) References Cited

U.S. PATENT DOCUMENTS

| | | | | |
|---|---|---|---|---|
| 6,119,118 A | * | 9/2000 | Kain et al. | 707/10 |
| 6,981,114 B1 | * | 12/2005 | Wu et al. | 711/162 |
| 2006/0026552 A1 | * | 2/2006 | Mazzitelli et al. | 717/101 |
| 2006/0212746 A1 | * | 9/2006 | Amegadzie et al. | 714/6 |
| 2007/0101069 A1 | * | 5/2007 | Corbett et al. | 711/141 |

* cited by examiner

*Primary Examiner* — Anteneh Girma
(74) *Attorney, Agent, or Firm* — Anderson Gorecki & Rouille LLP

(57) ABSTRACT

Accordingly a method and interface allows an attribute data base used by an Information Manager to be quickly populated and accurately maintained. A single Bulk Attribute Retrieval Request triggers the primary storage device to collect object attribute information. The method allows for selective collection of objects and attributes by providing filters and attribute lists in the Requests. The Request may be used to provide an incremental scan with appropriate time stamp filtering. In addition, the size of the results can be controlled by the IM by eliminating attributes that are not of interest to the IM. The Request is advantageously issued over a FileMover interface, which is an HTTP connection, and encoded in XML, allowing the IM to easily customize the Request as desired.

16 Claims, 5 Drawing Sheets

METHOD AND APPARATUS FOR PERFORMING BULK FILE SYSTEM ATTRIBUTE RETRIEVAL

FIELD OF THE INVENTION

This invention relates generally to the field of file systems and more specifically to managing file storage.

BACKGROUND OF THE INVENTION

Tiered storage solutions generally include multiple levels of storage systems, each one providing a different level of data storage service. Some storage systems are very expensive, providing fast and feature rich service options for data storage, while other, less expensive storage systems provide fewer features at reduced performance. The components that are included in a particular customer's storage solution should correlate the cost spent on storage to the perceived value of stored customer information. Thus customers such as financial institutions with larger amounts of 'critical' data may include a larger number of expensive systems than customers with less critical data.

However, selecting the appropriate storage systems to use in the storage solution does little to ensure that the storage is used appropriately. During operation, as a customer accesses data file objects, the objects are transferred between the different tiers of the storage solution. As time passes objects are displaced from their allocated devices, resulting in inappropriate use of storage. To remedy this problem, storage solutions often include an Information Manager (IM). The Information Manager (IM) is a host device which stores at least a subset of file system meta-data. The meta-data includes attribute information for each object in the file system. The IM analyzes the file-system meta-data to identify objects that should be moved to a different storage tier. The IM moves objects to different tiers to maintain the alignment of object value to storage device service level.

Because object migration is based on the meta-data stored by the IM, it is critical that the IM data base stores a complete and current version of the object attributes that are used when determining an objects' value. The accuracy of this database is crucial for effective object management, however, the population and maintenance of the database is time consuming and heavy in resource utilization. This is because to populate the meta-data data base, or to retrieve appropriate meta-data for processing on-demand, the Information Manager must scan all files on primary storage using a series of Network Attached Storage (NAS) protocol operations. The process of scanning all of the files on the primary storage is referred to as a "NAS crawl."

During the NAS crawl, each object is located, and all attribute information associated with the object is collected. The retrieval of all attribute information necessitates multiple NAS operations because different NAS protocols (such as Network File System (NFS) and Common Internet File System (CIFS)) associate different attributes with each object. For example, at a minimum at least three NAS operations are required to collect the attribute data: a directory lookup, NFS attribute retrieval and CIFS attribute retrieval. Additional primary server access operations may be required to retrieve optional extended attributes. Each operation generates network and CPU processing load associated with Transmission Control Protocol (TCP) and NAS protocol stack processing on both the Information manager host and on the server. Even if multi-threading techniques are applied to reduce the latency associated with attribute retrieval, the overhead associated with populating the IM data base becomes prohibitively time and compute intensive as the file system grows large.

Once the data base is populated it may be used to identify files that should be migrated to different storage tiers. However, as the objects are used over time, the IM data base may become out of synch with the actual file system. To ensure the accuracy of file migration operations, the Information Manager must periodically synchronize its meta-data database with the current contents of the primary storage. There is generally a limited time window afforded to the data base update operation in order to minimize its' impact on the performance of the storage system.

Several different methods may be used to synchronize the meta-data of the IM data base with the file system. For example, a NAS crawl may be performed to identify changed files. However, as described above, a NAS crawl of the primary storage file system will become prohibitively time and compute intensive as the file system grows large. Alternatively, event notifications may be issued by the NAS server to inform the Information Manager whenever a change in the file system meta-data occurs. The event notification approach suffers from the performance overhead incurred on the NAS server to generate and send the events. In addition, in periods of heavy change, the IM may not be able to adequately handle the event stream, causing events to be 'missed', and the data base accuracy to be compromised.

Another method for synchronizing the data base is to generate attribute update logs. The logs may be periodically scanned to identify files having updated attributes. However, such an approach degrades the performance of the NAS server, which uses valuable compute cycles generating log information, and may also incur significant overhead storage costs to maintain the logs.

The performance issues caused by the maintenance of the IM data base by the Information Managers may tend to outweigh the benefits provided by their services. IMs may seek to decrease the data base population time by retrieving only basic attributes, but such a data base optimization reduces the complexity of values that may be attributed to objects, thereby concomitantly reducing the effectiveness of the file migration process. It would be desirable to identify a method which would permit complex analysis of file objects for file migration purposes, without adversely affecting storage system performance or over taxing storage resources.

SUMMARY OF THE INVENTION

According to one aspect of the invention, a method of collecting file system object attributes in response to a Bulk Attribute Retrieval (BAR) request includes the steps of decoding the BAR request to identify a file system root, identifying file system objects associated with the file system root and retrieving attributes of the identified file objects, and selectively storing the retrieved attributes of each identified object in a result file.

According to another aspect of the invention, a method of collecting file system object attributes includes the steps of encoding a Bulk Attribute Retrieval (BAR) request including a file system root and an output file name, forwarding the BAR request to a storage system to retrieve attributes associated with objects in the file system, receiving a response indicating that a collection of attributes has completed and retrieving an output file having the output file name from the storage system.

According to another aspect of the invention, an apparatus for generating a Bulk Attribute Retrieval (BAR) result including attributes associated with file system objects includes decode logic for decoding a BAR Request to determine a file system root and a file system, stored on a computer readable medium, the file system including a plurality of objects. Each object in the file system has a plurality of attributes and the apparatus includes means for searching the file system to identifying file system objects associated with the file system root and for retrieving attributes of the identified file objects, a data store and means for selectively storing the retrieved attributes of each identified object in a result file in the data store.

According to a further aspect of the invention, an application programming interface stored in a computer readable medium of a file server includes program code that is operable when executed in response to a Bulk Attribute Retrieval (BAR) request to decode the BAR request to identify a file system root, identify file system objects associated with the file system root and retrieve attributes of the identified file objects; and selectively store the retrieved attributes of each identified object in a result file.

According to another aspect of the invention, a file server includes a computer readable medium having program code stored thereon. The program code includes a Bulk Attribute Retrieval (BAR) instruction, the BAR instruction comprising a file system path name and an output file name, the BAR instruction operable, when executed, to cause the file server to selectively collect attributes of objects in the file system associated with the file system path name for placement into an output file matching the output file name.

With such an arrangement, network resource utilization is minimized because all attribute information from a number of different sources may be retrieved using only one instruction. In addition, the ability to selectively collect objects based on the values of one or more attributes narrows the set of collected results to only those objects of interest to an Information Manager (IM), thereby reducing the amount of that needs to be stored and forwarded, thereby reducing any performance impact of the IM.

DETAILED DESCRIPTION

The present invention is directed to an interface, method and apparatus that enables bulk retrieval of file system object attributes for storage and use by an Information Manager. According to one aspect of the invention, a storage system incorporates an interface that operates, in response to a Bulk Attribute Retrieval (BAR) Request, to collect attributes, selected from a group of all possible object attributes, for each object in a file system tree rooted at a specified file system path. The collected attributes are bundled into a data file that is returned to the Information Manager at the Information Manager's convenience. With such an arrangement, rather than the numerous NAS operations required in the prior art implementation, an Information Manager need only issue a single request to receive all attribute information of interest to the Information Manager. The storage system collects all the attribute information for the objects without having to use NFS or CIFS to walk the directory tree. As a result, the network stack overhead and processing load at the storage system and IM are drastically reduced. In addition, because attribute retrieval is controlled by the storage system, rather than in response to NAS requests by the IM, the storage system may optimize attribute retrieval performance, for example by multi-threading accesses or using read-gathering techniques.

In one embodiment, the Bulk Attribute Retrieval Request augments an existing Application Programming Interface (API) that couples the IM and the file server. The API may be, for example, a File Mover API, implemented in the Celerra™ product line manufactured by EMC² Corporation of Hopkinton, Mass., and described in U.S. patent Ser. No. 11/085,898, filed Mar. 21, 2005, entitled, "Selection of Migration Methods Including Partial Read Restore in Distributed Storage Management", by Amegadzie et al, and incorporated herein by reference.

The FileMover API is used by the IM to migrate files between primary storage and secondary storage. For the purposes of this application, primary storage refers to a Network Attached Storage (NAS) device that is coupled to a NAS client and stores files, file data and offline file information. Secondary storage is coupled to the primary storage, and is used to store offline files. Secondary storage may be any device that provides CIFS, NFS, or HTTP access to files.

Figure 1:
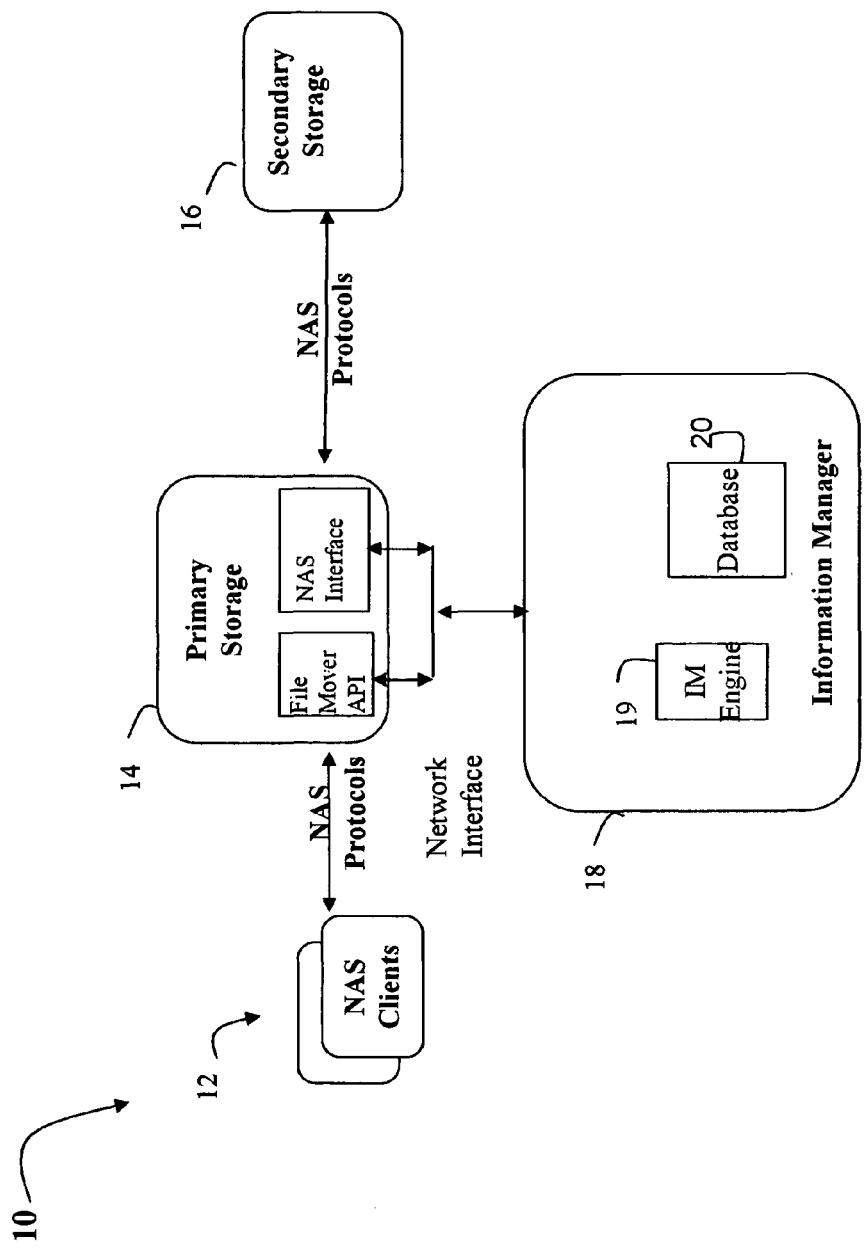
FIG. 1 is a diagram of a tiered network storage architecture in which the present invention may be used.

For example, FIG. 1 illustrates a tiered storage architecture in which the present invention may be used. One or more NAS clients 12 are coupled via a local network to NAS primary storage 14. The NAS storage has its own network address and may be accessed using a variety of network protocols, including but not limited to the Network File System (NFS) protocol of Sun Microsystems and the Common Internet File System (CIFS) provided by Microsoft Systems. An exemplary NAS device that may be used for primary storage is any Celerra product provided by EMC² Corporation of Hopkinton Mass. The selection of a storage device for the secondary storage platform 16 is a matter of design choice, depending upon the business needs, perceived value and associated protection levels to be afforded to off-line data. For example, a storage platform selected from EMC2's Centera product family may be used to provide secondary storage.

It should be noted that although the below description refers to the FileMover interface and provides examples of storage platforms that may be used, the present invention is not limited to the specific embodiments disclosed. Rather, any method that enables an Information Manager or equivalent device to communicate a request to a storage platform to collect a selected subset of all available attribute information may be substituted herein without affecting the scope of the present invention.

The IM illustrated in FIG. 1 includes an Information Management Engine 19, which is a combination of hardware and software components that is used to analyze object attribute information, determine value, and identify when an object should be moved between primary and secondary storage. IM also includes a data base 20, which is used to store object attribute and location information. Providing the data base locally to the IM engine improves the speed of decision making and hence the performance of the IM. The IM is connected to the primary server via a LAN connection. The IM communicates with a NAS interface of the primary storage using NAS protocols, and also communicates with a FileMover interface of the primary storage using HTTP protocols.

HTTP is a request/response protocol used between clients and servers. An HTTP client, such as a web browser or the IM in the present invention, typically initiates a request by establishing a TCP connection to a particular port on a remote host. An HTTP server listening on that port waits for the client to send a request string followed by an email-like MIME message which has a number of informational header strings that describe aspects of the request, followed by an optional body of arbitrary data. Upon receiving the request, the server sends back a response string and a message of its own, the body of which is perhaps the requested file, an error message, or some other information. Resources used in the HTTP are identified using Uniform Resource Identifiers (URIs).

In one embodiment, the FileMover API is implemented as an HTTP connection between the IM and the primary storage. FileMover commands are encoded in Extensible Markup Language (XML) format and then transported using the HTTP protocol to the primary storage. A response from the primary storage is also encoded in XML. The use of the HTTP connection and XML encoded communications between the IM and the primary storage advantageously makes the FileMover API available for use by an IM client executing any operating system, whether the operating system, including Unix and Windows.

Figure 2:
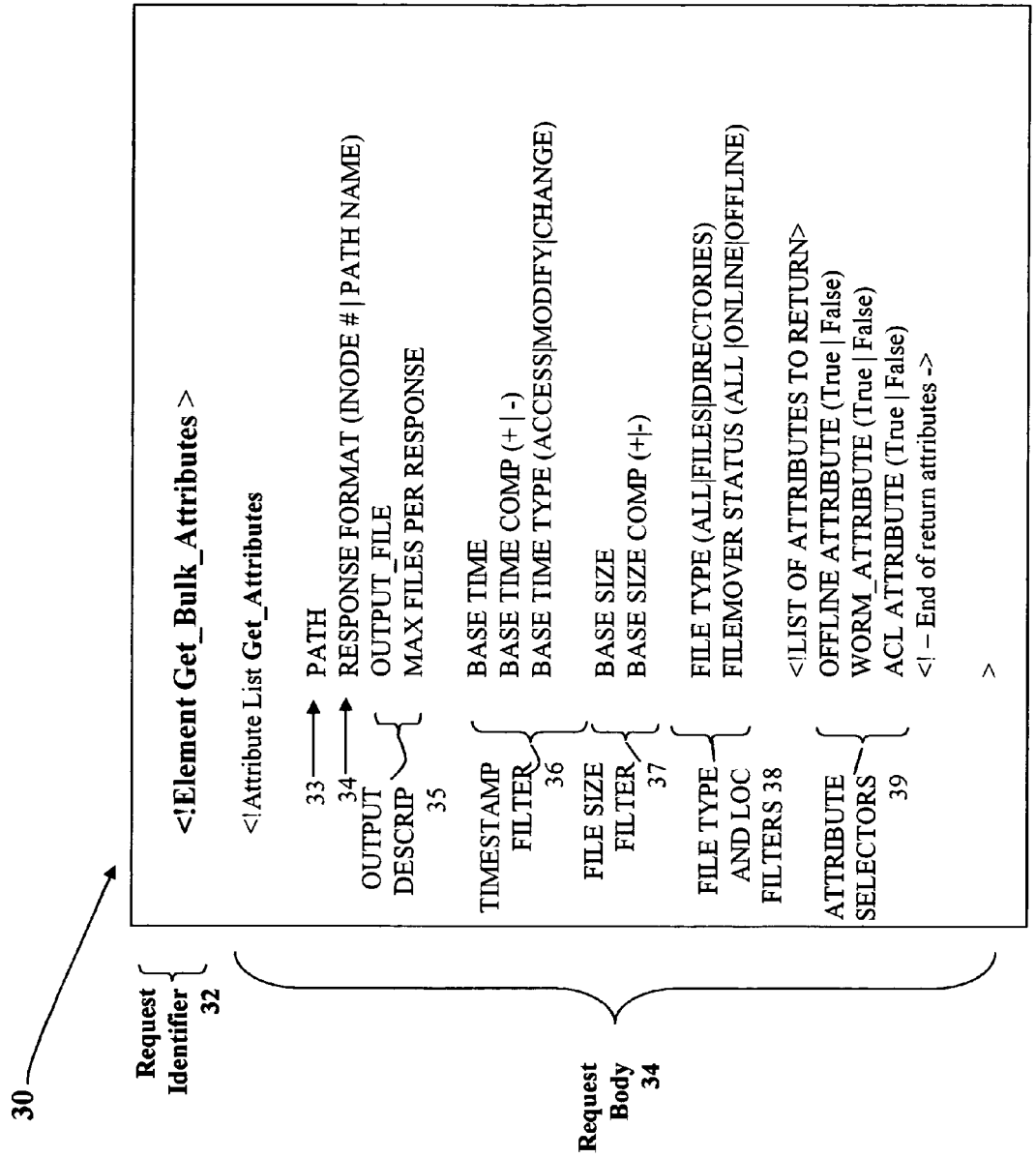
FIG. 2 is a diagram illustrating exemplary fields that may be included in a Bulk Attribute Retrieval (BAR) Request of the present invention.

FIG. 2 illustrates exemplary fields that may be included in a Bulk Attribute Retrieval (BAR) Request issued by the IM to a FileMover API in a storage system of the present invention. As mentioned above in the present invention the FileMover API is augmented to include a Bulk Attribute Retrieval (BAR) Request. The FileMover API XML uses an HTTP connection as a transport mechanism. The details and methods used to establish the HTTP connection, and header text associated with the HTTP transport are known to those of skill in the art, and will not be described in detail herein.

The Bulk Attribute Retrieval (BAR) Request includes a Request identifier 30 ("Get_Bulk_Attributes") and a Request body 32. One of the benefits of the use of XML code is that it is extensible; thus, although various fields will be described as included in the Request body 32, the IM can add or delete lines from the Request in accordance with the information that it needs to collect. Three fields that should be included in every Request are the PATH field 33, the RESULT FORMAT field 34 and the Output Descriptor information 35. The PATH field 33 is the full path of the root of the file system tree from which attribute data is to be extracted. The RESULT FORMAT field 34 indicates whether the returned objects are to be identified by inode number or full path name. If the inode number is selected, then the parent directory inode number is also returned for each object. The Output Descriptors 35 include an Output File name and an optional MAX FILES PER RESPONSE field. The OUTPUT FILE field specifies the full path name of the file in the file system which is to store the bulk meta-data output. MAX FILES PER RESPONSE specifies how many object entries are to be packed within a single Response in the output file. For example, if the value is 100, and there are a total of 1000 files that match the search criteria of the Request, then there are 100 individual responses stored in the output file. As will be described in more detail below, responses can either be streamed back to the IM in an HTTP response, or alternatively the IM can retrieve the responses using NAS communications at its convenience. Objects can be filtered based on values of their attributes to narrow the set of collected results to only those objects of interest to the IM.

Both "online" and "offline" objects can be filtered. An "online" object is a file object in a file system that stores both the meta-data and data associated with the file; i.e., the file data is resident on the primary storage device. An "offline" object is an object in a file system that stores all the meta-data commonly associated with a file, but not any data. Instead, in addition to the file meta-data, an "offline path" is stored. The "offline path" identifies a file server which stores the data for the offline file, a choice of data access protocol (e.g. CIFS, NFS, HTTP), and an identifier which will enable the a client to retrieve the file data from the server using the specified protocol. One advantage of the present invention is that it may be used to identify objects of interest to the IM, whether the object is "online" or "offline."

In general, for each attribute which has a numeric value, the Request can include a specific value, and provide a comparison to be used for filtering. For each attribute which has a string value, the Request can include a simple regular expression which is applied to the attribute for filtering. Multiple filters are treated as conjunctions, so that each object for which attributes are returned satisfies all filters provided in the Request. For example, filtering objects based an "online" (or similar) attribute permits rapid identification of files that are candidates for migration, (which typically represent 20-30% of the entire file population), thereby significantly reducing the load on File Server and IM resources, and speeding up an IM database update. Or, by performing complex filtering objects with an "offline" attribute may be useful in allowing the IM to perform administrative procedures on its Database (e.g. orphan file pruning).

FIG. 2 illustrates examples of several different filters that may be included in a Request. The Request body may include Timestamp filter fields 36. The timestamp filter fields are generally used to filter the objects prior to the inclusion of their attribute information in the Result based on one or more time stamps of the object. The BASE_TIME field may be used to store a time stamp against which each file is to be compared. BASE_TIME_COMP indicates whether a successful comparison is greater than or less than the BASE_TIME value. Thus, if the BASE_TIME_COMP field is a +, attributes of files that are with a time stamp greater than the time stamp in the BASE_TIME field will be included in the result. The BASE_TIME_TYPE field selects which time stamp of the file to use for comparison purposes, either the access time timestamp, the modification time timestamp or the change timestamp. The Timestamp filter fields can therefore be used to provide an incremental scan of the file system for IM data base maintenance purposes (described in more detail below).

Objects can also be filtered based on their size, using the File Size Filter fields 37. Only the attributes of objects that satisfy the File Size filter are passed to the result file. The BASE SIZE field stores a value to use in comparison for returning results. In one embodiment, a value of 0 indicates that there is no comparison based on file size. The BASE SIZE COMP field indicates whether a successful compare is greater than or less than the BASE SIZE field. For example, a + includes files that are greater than or equal to BASE SIZE, a − includes files that are less than the BASE SIZE.

File Type and Location filters 38 allow the IM to further streamline the results in accordance with its needs. The objects having attributes that are included in the result may be filtered based on their FILE TYPE. When the FILE TYPE is set to ALL, all files and directories are returned in the result.

When FILE TYPE is set to Files, all matching regular files (but not directories) are returned. When FILE TYPE is set to Directories, all matching directories are returned. Objects may also be filtered based on their on-line or off-line location, thus allowing the IM to accurately identify all off-line files.

In addition to narrowing the number of objects that are returned, the Request can also reduce the types of attributes that are returned for each object using the attribute selector list 39. The attribute selector list identifies attributes that are to be collected by primary storage for return to the IM. In the prior art, CIFS or NFS attribute retrieval operations caused all the protocol specific information to be collected and returned to the IM, thereby wasting resources and bandwidth on information that is unused by the IM. In contrast, in the present invention, because the IM specifies the attributes of interest in the BAR Request, primary storage and the IM need only allocate resources for storing the attributes of interest. In addition, unlike the prior art, no network bandwidth is wasted in the transfer of unusable attributes to the IM. For example, an IM may request only a modification time attribute for the objects in the file system; other NFS attributes would not be collected for the objects. Alternatively the IM may ask to retrieve all CIFS attributes except for Access Control Lists, which often consume a large amount of space. The ability to select attributes of interest allows the IM to optimize resource utilization during population and maintenance of the IM data base.

FIG. 2 illustrates one example of an attribute selector list, including OFFLINE attribute, WORM attribute and ACL attribute. Note that the OFFLINE attribute is an attribute of the FileMover Protocol, the ACL attribute is an attribute of the CIFS protocol, while the WORM attribute is an attribute particular to the primary storage operating system. A user can selectively include or delete any of this data from being included in the response. In addition, because the list is extensible, an IM can customize the Request to add or delete attributes from the Attribute Selector list. Accordingly, although FIG. 2 illustrates an exemplary Request, the present invention is not limited to a Request having any particular fields other than the file system path and an output file indicator.

Figure 3:
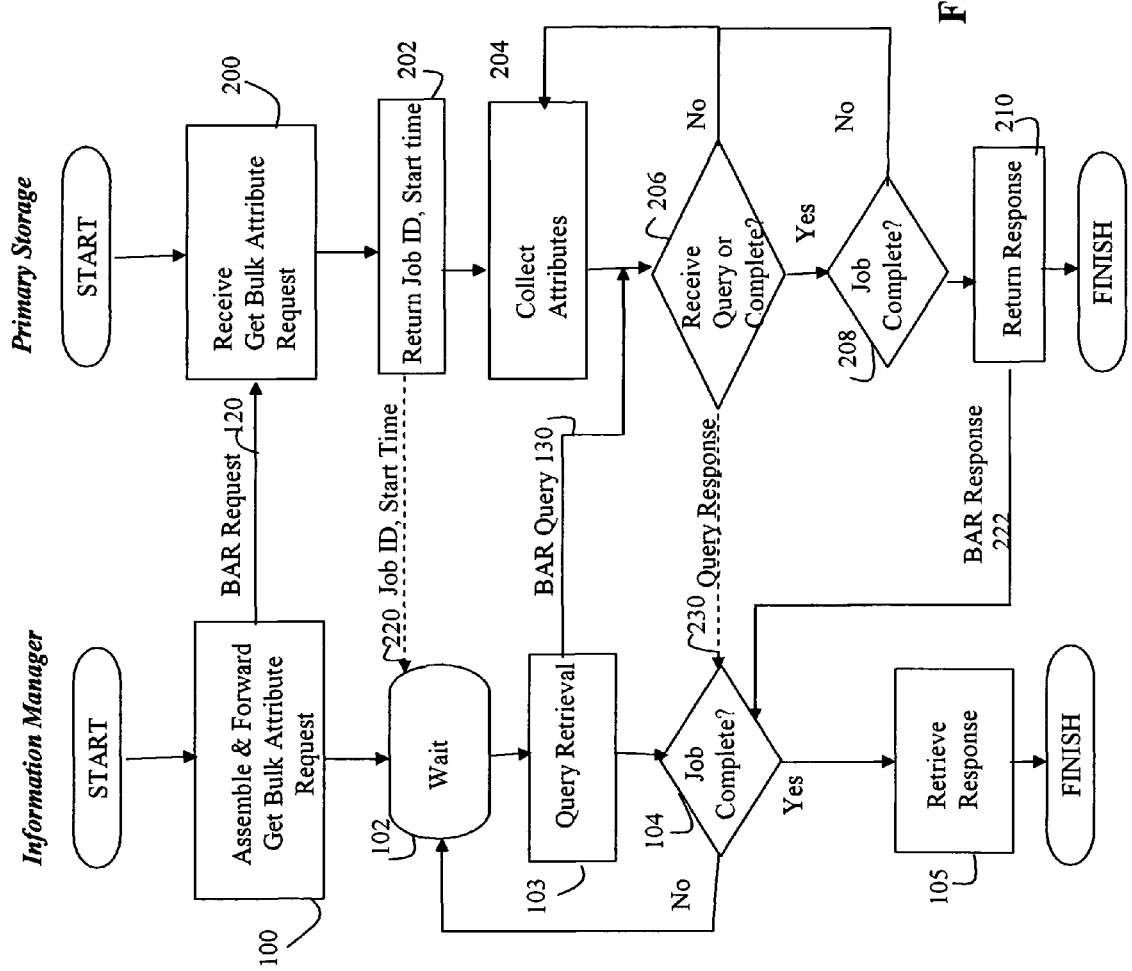
FIG. 3 is a flow diagram illustrating exemplary steps that may be performed by an Information Manager and primary storage to collect attribute information using concepts of the present invention.

Referring now to FIG. 3, a flow diagram is provided, illustrating exemplary steps that may be performed by the primary storage and the IM during a Bulk Attribute Retrieval process of the present invention. At step 100, the IM 18 assembles and forwards the Bulk Attribute Retrieval (BAR) Request to the primary storage 14. At step 200, the Primary storage receives the BAR Request, and at step 202 forwards an indication of successful receipt of the Request, along with a JOB ID and Job Start time to the IM. The IM proceeds to step 102, where it waits for completion of the bulk attribute assembly by primary storage.

At step 204 primary storage initiates collection of attribute data for all of the objects associated with the file system path name included in the BAR Request, by accessing each of the objects in the hierarchy rooted by the file system path. The primary storage applies the filters and selectors that are included in the BAR Request when building the response database.

In one embodiment of the invention, the primary storage device may advantageously include pre-generated indices that may be used to increase the speed of object attribute collection. Each pre-generated index is a list of one or more objects having attribute values satisfying a query associated with the index, although the use of such indices is not a requirement of the invention. The generation, maintenance and use of such indices is described in patent application Ser. No. 11/241,132, entitled "Apparatus and Method for Building a File System Index," filed Sep. 30, 2005 by Fridella et al, and incorporated by reference.

While the primary storage is assembling the response, the IM may periodically query the primary storage for status, by forwarding a BAR Query, including the Job ID, to the primary storage. Upon receipt of the query, the Primary storage forwards back to the IM a query response, indicating whether or not the operation completed without error, or if an error has occurred.

Eventually at step 208 the primary storage will complete the retrieval of attribute information and the population of the response file. The primary storage then forwards, at step 210, a BAR response to the IM. The BAR response may indicate various information to the IM, for example a job duration, number of files searched, number of files processed, number of files matched, a job complete flag, and a full path name to the results file.

After the IM learns at step 104 that the Response is complete, at step 105 the IM retrieves the results of the BAR Request. As mentioned earlier, there are a variety of ways that the IM can retrieve the result output file. The result output file may be broken down into a discrete number of Responses. The IM may choose to use the HTTP connection between the IM and the primary storage to have the BAR Response(s) sequentially streamed back to the IM. Alternatively, the IM may simply pull the Responses from the file where they are stored in the file system using NAS protocols.

The process outlined in FIG. 3 collects attribute data for each object rooted by the file system path included in the Request. Although such a full scan is time consuming, it should be performed for initial population of the IM data base. However the full scan may not be necessary for routine maintenance of the data base. Rather, incremental scans may be performed to identify changed objects for data base update.

One method of performing an incremental scan is to simply forward a BAR Request with time stamp filters set to return only those files with a modify, access or change time within a set window. However, although such a scan would provide significant improvements over current technology, it still necessitates the access of each object for comparison purposes.

According to another aspect of the invention, volume based views of the file system are used to provide file system checkpoints at periodic intervals. Successive checkpoints are compared to identify file system blocks that have changed during the periodic interval. Following the identification of changed inode blocks in this manner, then only the changed objects associated with the inodes are accessed to retrieve attribute data. Such an arrangement provides significant performance advantages over scanning each object in the file system.

Figure 4:
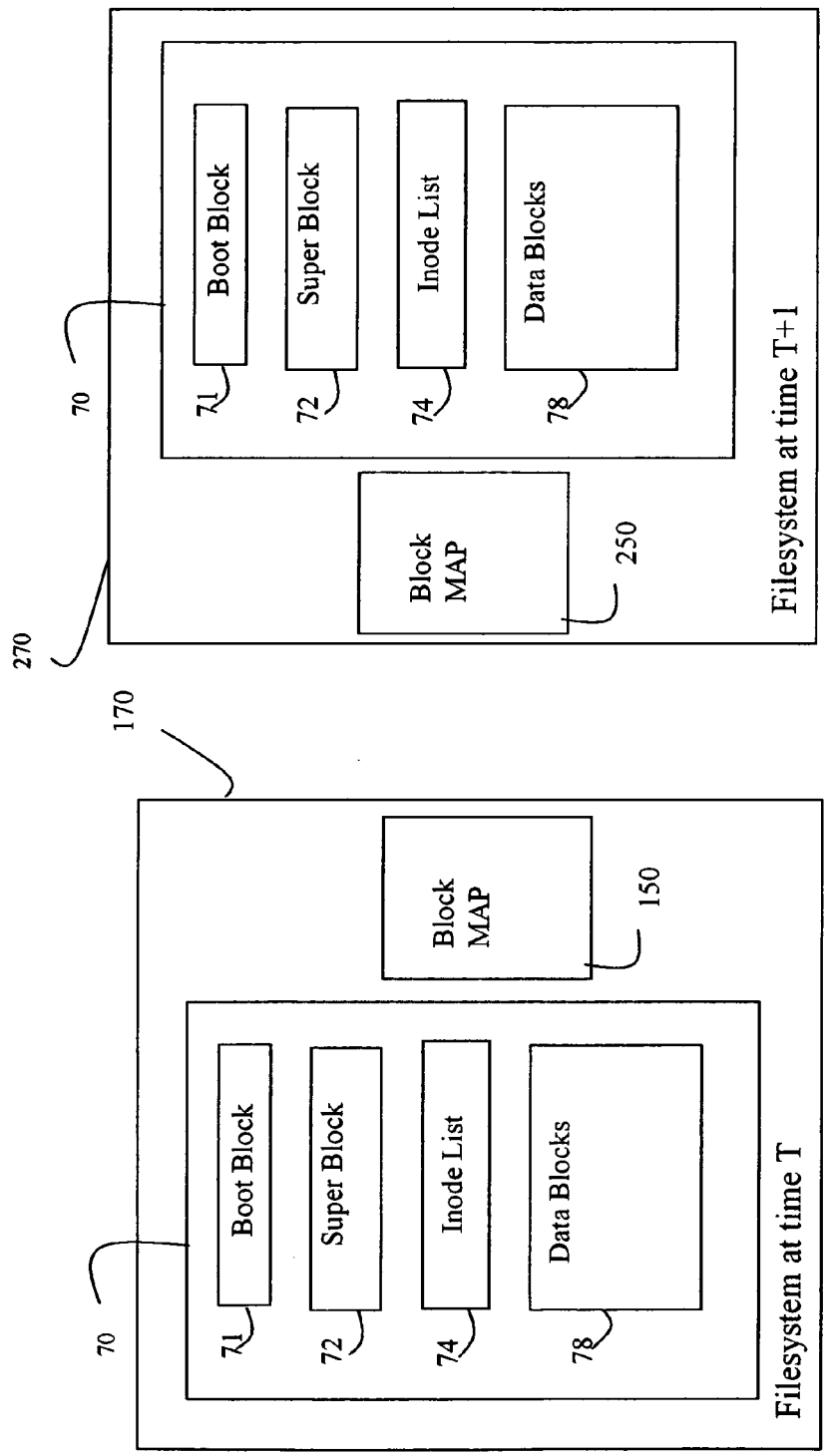
FIG. 4 is a block diagram illustrating file system checkpoints that may be used to maintain a database generated using the process of FIG. 3.

Referring now to FIG. 4, an exemplary file system 70 is shown to include an arrangement of disk blocks including a Boot Block 71, a Super Block 72, an Inode List 74 a Bit map 76 and Data Blocks 78. The Boot Block 71 stores the Operating System (OS) boot code. The Super Block 72 stores information relating to the inode and data blocks in the file system, including number, availability, location and size information.

The inode list includes one or more inodes, where an inode is a data structure which identifies files in a file system. There is an inode for each file and a file is uniquely identified by the file system on which it resides and its inode number on that system. Each inode contains meta-data associated with the file and a list of links to one or more of the data blocks 78 that comprise the file. The file meta-data may include, but is not restricted to, locking information, mode and type of file, the number of links to the file, the owner's user and group ids, the number of bytes in the file, the addresses of the file's blocks on disk and migration status for the file, i.e. whether the file is "offline" or "online."

Each inode also stores access and modification times indicating when the file has been modified, when it was last accessed, or when the inode has been modified last. Whenever the contents of the file are changed, the "inode modified time" also changes. Moreover it changes when there are changes for the inode like permission change, creating a link etc.

According to one aspect of the invention, file system checkpoint technology is used to efficiently identify changes that have occurred in a file system between two points in time. Checkpoint technology involves taking periodic snapshots, or checkpoints, of the file system. Several versions of the checkpoints may be retained for backup or other purposes. The checkpoints can be used to service incremental scan requests.

For example, FIG. 4 illustrates two checkpoints of the same file system, taken at different times. Technology that may be used to retrieve a checkpoint is described in U.S. Pat. No. 7,177,994, titled Checkpoint and Consistency Markers, filed Mar. 4, 2005, incorporated herein by reference. A first file system checkpoint 170 reflects the contents of the file system 70 at time T and a second file system checkpoint 270 reflects the contents of the file system at time T+1. Each of the checkpoints includes a block map (150, 250), which is a bit map indicating which blocks have changed since the generation of the checkpoint. The block map can be used quickly identify modified blocks and service an incremental scan Request orders of magnitude faster than a full scan (either through a NAS crawl, or internal to the NAS server).

The time required for an incremental scan using such a method is faster because it is a function of the number of changes between scan points, not the size of the file system. This allows the incremental scan to easily complete within its allocated window, even as the file system scales.

Figure 5:
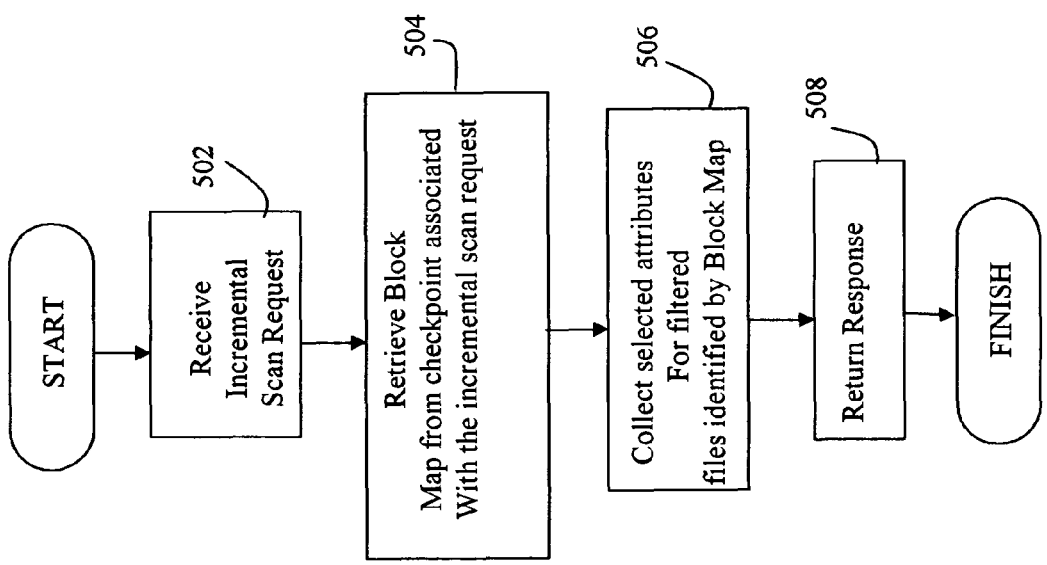
FIG. 5 is a flow diagram illustrating exemplary steps that may be taken when performing an incremental scan of a file system using concepts of the present invention.

FIG. 5 illustrates exemplary steps that may be taken during a process 500 of when performing an incremental scan of the file system to identify updated objects for updating attribute information in an IM database. At step 502, the IM forwards a BAR Request to the primary storage. The BAR Request may include time stamp filter fields, indicating that it is requesting updated attributes for only those objects that have been modified since a selected time T. At step 504, the checkpoint associated with time T is identified, and the Block Map reflecting changes since the checkpoint is read into memory. At step 506 the primary storage begins the task of preparing the results. For each inode block that is indicated as changed in the Block Map, all the inodes in that block (typically 16) are read and checked. If an inode itself has changed (timestamp different), the selected attributes are read and gathered into the result. If the OUTPUT FORMAT indicated by the BAR Request has specified the inode based output format, then the parent directory inode is identified from the inode meta-data and written into the result. If the Request has specified full path name format, then the parent inode links are followed to calculate the full path and this string is dumped into the result. At step 508, the response is returned to the IM host.

One advantage of using the Block Map in this manner is that the inodes associated with changed files can quickly be identified. In addition, each inode stores the attribute data, so that data is also quickly available for return to the IM. The selection of a Result Format that is volume based (i.e., in dump format, returning inode and directory inode information) allows this attribute data to be quickly returned to the IM, allowing the IM to perform the file name conversion. However, it may also provide improved performance for incremental scan Requests with a full path name result output, and thus this particular method of maintaining the IM database is not limited to any particular response format.

Accordingly a method and interface has been described that allows an attribute data base used by an Information Manager (or similar migration service) to be quickly populated and accurately maintained. A single Bulk Attribute Retrieval Request triggers the primary storage device to collect object attribute information. As a result, the amount of network resources previously utilized when the collection was performed by the IM is reduced, and the primary storage can use multi-threading and other pipelining capabilities to speed up attribute collection. The method allows for selective collection of objects and attributes by providing filters and attribute lists in the Requests. Thus the IM can streamline the returned results by selective filtering of objects based on attribute values. The Request may be used to provide an incremental scan with appropriate time stamp filtering. In addition, the size of the results can be controlled by the IM by eliminating attributes that are not of interest to the IM. The Request is advantageously issued over a FileMover interface, which is an HTTP connection, and encoded in XML, allowing the IM to easily customize the Request as desired. Results can be streamed back to the IM over the HTTP connection, or alternatively the results may be stored in the file system, and retrieved at the IM's convenience, in either dump or TAR format.

Many of the above figures are flowchart illustrations of methods, apparatus (systems) and computer program products according to an embodiment of the invention. It will be understood that each block of the flowchart illustrations, and combinations of blocks in the flowchart illustrations, can be implemented by computer program instructions. These computer program instructions may be loaded onto a computer or other programmable data processing apparatus to produce a machine, such that the instructions which execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Those skilled in the art should readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media for example using baseband signaling or broadband signaling techniques, including carrier wave signaling techniques, such as over computer or telephone networks via a modem. The above description and figures have included various process steps and components that are illustrative of operations that are performed by the present invention. However, although certain components and steps have been described, it is understood that the descriptions are representative only, other functional delineations or additional steps and components can be added by one of skill in the art, and thus the present invention should not be limited to the specific embodiments disclosed. In addition it is understood that the various representational elements may be implemented in hardware, software running on a computer, or a combination thereof.

While the invention is described through the above exemplary embodiments, it will be understood by those of ordinary skill in the art that modification to and variation of the illustrated embodiments may be made without departing from the inventive concepts herein disclosed. Accordingly, the invention should not be viewed as limited except by the scope and spirit of the appended claims.

The invention claimed is:

1. A method comprising:
in a network in which at least one client is coupled to at least one data storage system which utilizes tiered levels of storage associated with different data storage devices, collecting file system metadata in response to a request having a timestamp by:
decoding the request to identify a file system tree;
identifying file system objects associated with the file system tree;
retrieving a checkpoint based on the time stamp;
identifying blocks in the file system that have been modified since the checkpoint;
determining which identified objects are associated with modified blocks;
retrieving metadata including attributes of the identified file objects associated with modified blocks;
selectively storing the retrieved metadata in a result file; and
utilizing the result file for identifying objects for relocation between tiers.

2. The method of claim 1 wherein the request identifies a filtering attribute and a filtering attribute condition for use in filtering identified objects, and wherein the step of selectively storing includes discarding identified objects having values for the filtering attribute that do not satisfy the filtering attribute condition.

3. The method according to claim 1 including designating the timestamp from a group including a modify time stamp, an access time stamp and a change time stamp.

4. The method according to claim 2 wherein the filtering attribute is one of an offline and online status, and wherein the step of selectively storing includes discarding identified objects based on offline and online status.

5. The method according to claim 2 wherein the filtering attribute is a file size, and wherein the step of selectively storing includes discarding identified objects based on file size.

6. The method according to claim 2 wherein the filtering attribute is a file type, and wherein the step of selectively storing includes discarding identified objects based on file type.

7. The method of claim 1 wherein the request includes an attribute list, and wherein the step of selectively storing the retrieved attributes includes discarding attribute types that are not included on the attribute list.

8. The method of claim 7, wherein the attribute list includes at least one attribute selected from a group of modification time, access control list, off-line status, permission bits, file type, WORM status, access time, change time, owner, group, DOS read-only bit, DOS archive bit, link count, file size, directory size, DOS name, Unix name, Win32 name, or extended attributes.

9. Apparatus comprising:
a server including a computer program stored on a non-transitory computer-readable medium for generating a request having a timestamp; and
a data storage system which utilizes tiered levels of storage associated with different data storage devices, the data storage system being in communication with the server and including a computer program stored on a non-transitory computer-readable medium for collecting file system metadata in response to the request by:
decoding the request to identify a file system tree;
identifying file system objects associated with the file system tree;
retrieving a checkpoint based on the time stamp;
identifying blocks in the file system that have been modified since the checkpoint;
determining which identified objects are associated with modified blocks;
retrieving metadata including attributes of the identified file objects associated with modified blocks; and
selectively storing the retrieved metadata in a result file; and
wherein the server utilizes the result file for identifying objects for relocation between tiers.

10. The apparatus of claim 9 wherein the request identifies a filtering attribute and a filtering attribute condition for use in filtering identified objects, and wherein selectively storing the retrieved metadata includes discarding identified objects having values for the filtering attribute that do not satisfy the filtering attribute condition.

11. The apparatus of claim 9 wherein the timestamp is selected from a group including a modify time stamp, an access time stamp and a change time stamp.

12. The apparatus of claim 10 wherein the filtering attribute is one of an offline and online status, and including discarding identified objects based on offline and online status.

13. The apparatus of claim 10 wherein the filtering attribute is a file size, and including discarding identified objects based on file size.

14. The apparatus of claim 10 wherein the filtering attribute is a file type, and including discarding identified objects based on file type.

15. The apparatus of claim 9 wherein the request includes an attribute list, and including discarding attribute types that are not included on the attribute list.

16. The apparatus of claim 15 wherein the attribute list includes at least one attribute selected from a group of modification time, access control list, off-line status, permission bits, file type, WORM status, access time, change time, owner, group, DOS read-only bit, DOS archive bit, link count, file size, directory size, DOS name, Unix name, Win32 name, or extended attributes.

* * * * *